(12) United States Patent
Kidney et al.

(10) Patent No.: US 8,887,562 B2
(45) Date of Patent: *Nov. 18, 2014

(54) DIAGNOSTIC TIRE TEST METHOD

(75) Inventors: Jacob R. Kidney, Wadsworth, OH (US); John L. Turner, Tucson, AZ (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/881,325

(22) PCT Filed: Nov. 22, 2011

(86) PCT No.: PCT/US2011/061783
§ 371 (c)(1),
(2), (4) Date: Apr. 24, 2013

(87) PCT Pub. No.: WO2012/071379
PCT Pub. Date: May 31, 2012

(65) Prior Publication Data
US 2013/0205884 A1    Aug. 15, 2013

Related U.S. Application Data

(60) Provisional application No. 61/416,521, filed on Nov. 23, 2010.

(51) Int. Cl.
G01M 17/02    (2006.01)
(52) U.S. Cl.
CPC ................................. *G01M 17/02* (2013.01)
USPC ........................................... 73/146; 73/146.2
(58) Field of Classification Search
USPC ................................................. 73/146–146.8
See application file for complete search history.

(56) References Cited

U.S. PATENT DOCUMENTS

| | | |
|---|---|---|
| 3,893,330 A | 7/1975 | Shute et al. |
| 4,964,679 A | 10/1990 | Rath |
| 5,246,278 A | 9/1993 | Yoshino et al. |
| 5,546,308 A | 8/1996 | Yamamoto |
| 5,569,848 A | 10/1996 | Sharp |
| 5,948,035 A | 9/1999 | Tomita |
| 6,339,956 B1 | 1/2002 | Huinink et al. |
| 6,377,885 B2 | 4/2002 | Yasui et al. |
| 6,434,470 B1 | 8/2002 | Nantz et al. |
| 6,616,250 B1 | 9/2003 | Fennel et al. |
| 6,671,609 B2 | 12/2003 | Nantz et al. |
| 7,168,305 B2 | 1/2007 | Narayanaswamy |

(Continued)

OTHER PUBLICATIONS

Kim, Myoung Chan, International Search Report with Written Opinion from PCT/US2011/061783, 10 pp. (Jun. 1, 2012).

*Primary Examiner* — Andre Allen
(74) *Attorney, Agent, or Firm* — Shaun J. Fox; John Skeriotis

(57) ABSTRACT

Provided is a method for testing a tire. The method may comprise performing a first stopping distance test on a tire of a first specification at a first inflation pressure and gathering data about the first stopping distance test. The method may further comprise performing a second stopping distance test on a tire of the first specification at a second inflation pressure and gathering data about the second stopping distance test. The method may further comprise performing a first traction test on a tire of the first specification at either the first inflation pressure or the second inflation pressure and gathering data about the first traction test.

20 Claims, 6 Drawing Sheets

(56) References Cited

U.S. PATENT DOCUMENTS

| | | |
|---|---|---|
| 7,222,507 B2 | 5/2007 | Wetzel et al. |
| 7,448,701 B2 | 11/2008 | Nilsson et al. |
| 7,568,384 B2 | 8/2009 | Morinaga |
| 7,617,721 B2 | 11/2009 | McKeown et al. |
| 2004/0024514 A1 | 2/2004 | Levy et al. |
| 2004/0263324 A1 | 12/2004 | Sanchez et al. |
| 2005/0005692 A1 | 1/2005 | Giustino |
| 2006/0005616 A1 | 1/2006 | Bochkor et al. |
| 2006/0006990 A1 | 1/2006 | Obradovich |
| 2008/0110250 A1 | 5/2008 | Jones |
| 2008/0243334 A1 | 10/2008 | Bujak |
| 2011/0015906 A1 | 1/2011 | Bian et al. |
| 2014/0005883 A1* | 1/2014 | Kidney et al. ............... 701/34.4 |

* cited by examiner

DIAGNOSTIC TIRE TEST METHOD

This patent application claims priority to U.S. Provisional Patent Application Ser. No. 61/416,521 that was filed on Nov. 23, 2010.

TECHNICAL FIELD

Certain embodiments disclosed herein relate generally to tire testing or vehicle testing. More specifically, certain embodiment disclosed herein relate to an apparatus and method for testing tires to determine certain performance criteria.

BACKGROUND

Tire performance is an important concern. Among manufacturers and developers of tires and vehicles that use tires, as well as others, methods for testing for tire characteristics are of substantial interest.

It remains desirable to provide methods of testing tires and systems comprising tires.

SUMMARY

Provided is a method for testing a tire. The method may comprise performing a first stopping distance test on a tire of a first specification at a first inflation pressure and gathering data about the first stopping distance test. The method may further comprise performing a second stopping distance test on a tire of the first specification at a second inflation pressure and gathering data about the second stopping distance test. The method may further comprise performing a first traction test on a tire of the first specification at either the first inflation pressure or the second inflation pressure and gathering data about the first traction test.

Further provided is a method for testing a tire. The method may comprise generating stopping distance data about a first tire-vehicle system comprising a first vehicle and a tire of a first specification, said tire being inflated to a first inflation pressure. The method may comprise generating stopping distance data about a first tire-vehicle system comprising the first vehicle and a tire of the first specification, said tire being inflated to a second inflation pressure. The method may comprise generating mu-slip data for a tire of the first specification at either the first inflation pressure or the second inflation pressure.

DETAILED DESCRIPTION

Reference will be made to the drawings, FIGS. 1-6, wherein the showings are only for purposes of illustrating certain embodiments of a diagnostic tire test method.

A method has been developed to test tire properties. The combination of a particular set of tires with a particular vehicle is a tire-vehicle system. In certain embodiments, a diagnostic tire test method involves testing a vehicle engaged with a tire of a first tire specification, a tire-vehicle system, for stopping distance with the tire inflated to a first inflation pressure and testing the tire-vehicle system, for stopping distance with the tire inflated to a second inflation pressure.

In certain embodiments, these methods involve traction testing a tire of a first tire specification at the first inflation pressure, or the second inflation pressure, or both. Without wishing to be bound to any particular theory, a change in the inflation pressure to which a tire is inflated during testing may influence how the tire-vehicle system responds during the stopping distance maneuver.

Stopping Distance Testing

In certain embodiments, data regarding stopping distance of a tire-vehicle system may be collected or created. In certain embodiments, tire-vehicle system stopping distance testing may be conducted to provide data about the system stopping performance. In certain embodiments, a tire-vehicle system dry stopping distance testing may be conducted to provide data about the system dry stopping performance. In certain embodiments, tire-vehicle system stopping distance testing may be conducted on a track, proving grounds or other vehicle testing surface. A tire-vehicle system stopping distance testing may be conducted with an activated anti-lock braking system ("ABS") to provide data about the performance of the ABS.

Figure 2:
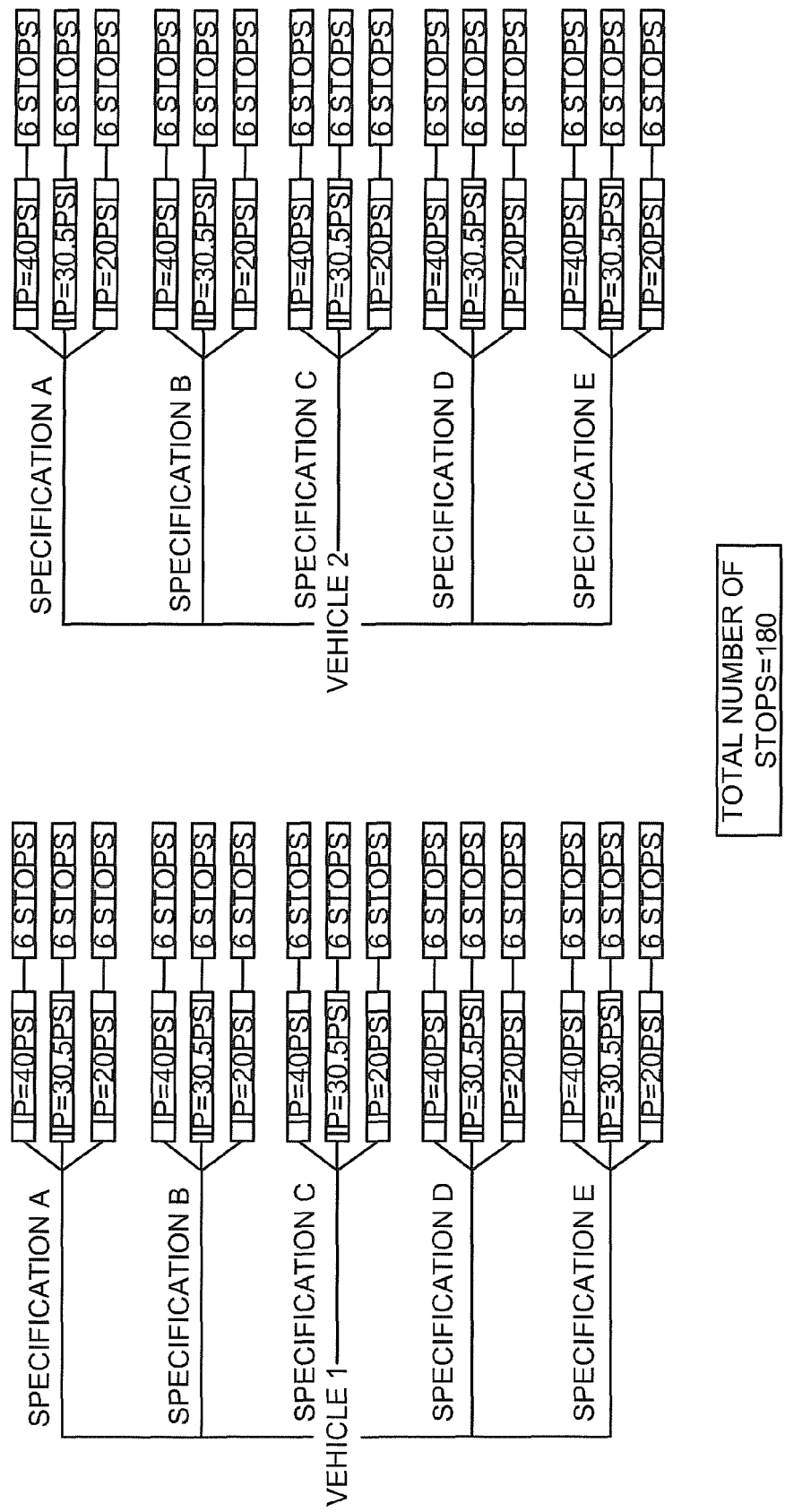
FIG. 2 is a graph summarizing dry stopping distance testing criteria in one embodiment.

In certain embodiments, a test vehicle may be instrumented with sensors to capture the behavior of the tire-vehicle system during a stopping maneuver. In certain embodiments, a stopping maneuver comprises a braking operation contemporaneously with, or prior to, data collection regarding, or sufficient to calculate stopping distance, wheel position, slip rate, braking force in the longitudinal direction or other directions, displacement in the longitudinal direction or other directions, velocity in the longitudinal direction or other directions, acceleration in the longitudinal direction or other directions, braking force in the longitudinal direction with respect to slip rate, or some combination thereof. In certain embodiments, a stopping maneuver comprises a braking operation and a steering operation. A stopping maneuver and the associated data collection may be referred to as a stopping distance test. A stopping distance test may comprise braking a vehicle from an initial speed to a final speed. In certain embodiments the final speed may be some non-zero speed or zero. A stopping distance test may comprise, steering a vehicle along a curved or straight path. A stopping distance test may comprise activation of an ABS. A non-limiting exemplary graph of a stopping distance testing criteria is shown in FIG. 2.

In certain tire and vehicle systems, the results of a stopping distance test, including the stopping distance, may be affected by inflation pressure such that a stopping distance advantage may be noticed at one of the inflation pressures. In certain embodiments, a stopping distance advantage may be a shorter stopping distance, a more efficient stopping operation, or otherwise.

In certain embodiments, stopping distance tests may be performed on a testing surface. In certain embodiments, a testing surface may comprise a track, roadway or other surface. In certain embodiments, a testing surface may comprise a dry surface, a wet surface, a snow-covered surface, or an icy surface. A testing surface may comprise concrete, asphalt, brick, gravel, sand, dirt, snow, water, ice, mud, oil, or some combination thereof.

In certain embodiments, a first set of stopping distance tests may comprise a first stopping distance test performed on a first tire-vehicle system, comprising a first vehicle and a first tire and a second stopping distance test performed on the first tire-vehicle system. In certain embodiments, a first set of stopping distance tests may comprise a first stopping distance test performed on a first tire-vehicle system, comprising a first vehicle and a first tire, and a second stopping distance test performed on a second tire-vehicle system, comprising the first vehicle and a second tire. A tire-vehicle system may be tested at a plurality of tire inflation pressures. In certain embodiments, a first set of stopping distance tests may comprise additional stopping distance tests performed on the first vehicle using a second tire, and, optionally, using one or more subsequent tires.

In certain embodiments, testing may comprise a second set of stopping distance tests analogous to the first set of stopping distance tests. In certain embodiments a second set of stopping distance tests may comprise tests performed on a second vehicle using the first tire, on the second vehicle using the second tire, and, optionally, tests performed on a second vehicle using one or more subsequent tires.

In certain embodiments, testing may comprise one or more additional sets of stopping distance tests analogous to the first set of stopping distance tests or to another set of stopping distance tests. In certain embodiments one or more additional sets of stopping distance tests may comprise tests performed on one or more additional vehicles using the first tire, on the one or more additional vehicles using the second tire, and, optionally, tests performed on the one or more additional vehicles using one or more subsequent tires.

In certain embodiments, stopping distance tests of tire-vehicle systems may be conducted on a plurality of vehicles, each with a plurality of tires, at a plurality of inflation pressures.

In certain embodiments, stopping distance tests of tire-vehicle systems may be conducted on a first vehicle engaged with a first tire inflated to a first inflation pressure and on the first vehicle engaged with the first tire inflated to a second inflation pressure. In certain embodiments, stopping distance tests of tire-vehicle systems may be conducted on a first vehicle engaged with a first tire inflated to a first inflation pressure and on the first vehicle engaged with the first tire inflated to a second inflation pressure, and, optionally, one or more additional stopping distance may be conducted on the first vehicle engaged with the first tire wherein each test is conducted with the first tire inflated to another inflation pressure. In certain embodiments, stopping distance tests of tire-vehicle systems may be conducted with an initial speed of less than 322 kph (200 mph). In certain embodiments, stopping distance tests of tire-vehicle systems may be conducted with an initial speed of 100 kph (62 mph). In certain embodiments, stopping distance tests of tire-vehicle systems may be with a final speed less than the initial speed. In certain embodiments, stopping distance tests of tire-vehicle systems may be with a final speed of 1 kph (0.62 mph) or 0 kph (0 mph). The "stopping distance" in a stopping distance test is the distance traveled while slowing from the initial speed to the final speed. As noted above, the "stopping distance" in a stopping distance test is not necessarily the distance traveled while slowing from the initial speed to 0 kph (0 mph) since the final speed is not necessarily 0 kph (0 mph). In certain embodiments, stopping distance tests of tire-vehicle systems may be conducted upon multiple vehicles, upon multiple tires, at multiple inflation pressures, at multiple initial speeds, and/or multiple final speeds.

In certain embodiments, a test vehicle, or test tire, or the wheel upon which a tire is mounted or the wheel upon which a tire is to be mounted may be instrumented with one or more sensors. In certain embodiments, a test track or test roadway or a patch thereof may be instrumented with one or more sensors. A sensor may be adapted to capture data regarding the behavior of a tire or vehicle or tire-vehicle system. A sensor may be part of a sensing system enabled to collect data regarding, or sufficient to calculate, stopping distance, wheel position, slip rate, braking force in the longitudinal direction or other directions, displacement in the longitudinal direction or other directions, velocity in the longitudinal direction or other directions, acceleration in the longitudinal direction or other directions, braking force in the longitudinal direction with respect to slip rate, or some combination thereof. A sensing system may comprise a sensor, a data storage device, a data processing device, a digital to analog converter, an analog to digital converter, a communication device, or a combination thereof.

In certain embodiments, for the stopping distance tests of tire-vehicle systems the vehicle may be instrumented with a wheel encoder and a velocity sensor adapted to acquire data such as, without limitation dry stopping distance, vehicle position, vehicle velocity, vehicle acceleration, wheel angular position, wheel angular velocity, wheel angular acceleration, or a combination thereof, or to acquire data sufficient to permit calculation thereof.

In certain embodiments, stopping maneuvers may be made with a tire-vehicle system prior to conducting stopping maneuvers from which or during which data is acquired. In certain embodiments, a stopping maneuver made with a tire-vehicle system prior to conducting stopping maneuvers from which or during which data is acquired is a conditioning maneuvers and may be useful for conditioning or breaking in a tire or tire-vehicle system.

Tire Traction Testing

Many modern vehicles comprise anti-lock braking system (ABS) controllers. Anti-lock braking system controllers may interact with tire mu-slip response in stopping distance performance testing.

Figure 1:
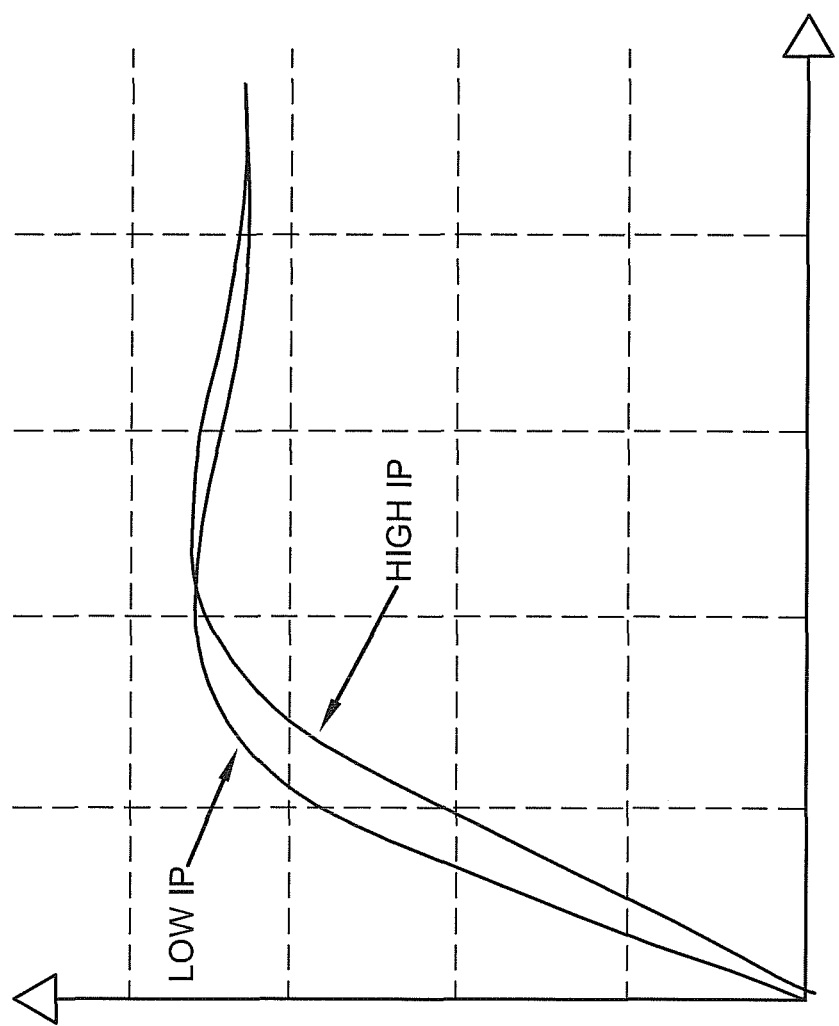
FIG. 1 is a non-limiting generic graph showing a mu-slip curve for a tire-vehicle system tested at two different inflation pressures.

In certain embodiments, in addition to a stopping distance test, testing may comprise a traction test of the tires tested in the stopping distance tests, or a tire of the same specification as the tires tested in the stopping distance tests, at the same or very similar inflation pressures. In certain embodiments, inflation pressures are precise to within approximately 1 psi. In certain embodiments, a traction test produces data about Fx, mu, slip rate, Fx-slip, or mu-slip. Mu is the force in the longitudinal direction, Fx, divided by the force in the normal direction, Fz, such that mu is Fx/Fz. Slip rate is the percentage of the difference between the surface speed of the wheel compared to the speed between axis and road surface; Slip Rate=(ωr−v)/v, where w is rotational speed of the wheel, r is wheel radius and v is vehicle speed. Mu-slip data is mu with respect to slip rate, or slip rate with respect to mu. A mu-slip curve is a graph of multiple mu-slip data points. A non-limiting generic graph showing a curve plotting mu-slip data, a mu-slip curve, for a tire-vehicle system tested at two different inflation pressures is shown in FIG. 1. An understanding of the nature of the mu-slip characteristics of a tire-vehicle system may make it possible to engineer changes thereto to affect braking performance. Accordingly, acquiring the mu-slip data for a tire is of interest. Mu-slip data may be acquired with either indoor or outdoor tire traction testing. In certain embodiments, tire traction testing produces multiple mu-slip curves for each tire by traction testing the tire and multiple inflation pressures with each such mu-slip curve corresponding to a single inflation pressure.

Without limitation, in certain embodiments, indoor tire traction testing may be performed on a flat belt tire testing machine ("FlatTrac"), such as, without limitation, an MTS Flat-Trac® Tire Test System, the flat belt tire test machine at Calspan TIRF, or a similar machine. In some situations, a FlatTrac machine must be properly tuned to provide well define mu-slip curves. A FlatTrac may test a tire on a substantially flat roadway simulation surface at a desired roadway speed, normal force, braking load, slip angle, slip rate, inflation pressure, and camber angle within machine limits.

Data Processing

The data obtained from stopping distance tests of a tire-vehicle system may be compared with or inform the traction testing and data obtained from traction testing of a tire. In some embodiments, the data obtained from stopping distance tests of a tire-vehicle system may be compared to or contrasted with data obtained from traction testing of a tire.

In certain embodiments, stopping distance tests of tire-vehicle systems may be conducted on a first vehicle engaged with a first tire inflated to a first inflation pressure and on the first vehicle engaged with the first tire inflated to a second inflation pressure. In certain embodiments, traction testing is performed on the first tire or on a tire having the same specification as the first tire at the first pressure and data about the tire performance at the first pressure is collected. In certain embodiments, traction testing is performed on the first tire or on a tire having the same specification as the first tire at the second pressure and data about the tire performance at the second pressure is collected. In certain embodiments, data about the tire performance may comprise data about Fx, mu, slip rate, Fx-slip, or mu-slip.

In certain embodiments, traction testing is performed on each tire that was tested as part of a tire-vehicle system that underwent stopping distance testing. In certain embodiments, traction testing is performed on each tire that was tested as part of a tire-vehicle system that underwent stopping distance testing, and each tire is tested at each pressure for which the tire was tested as part of a tire-vehicle system that underwent stopping distance testing. In certain embodiments, traction testing is performed on a tire that was tested as part of a tire-vehicle system that underwent stopping distance testing, at an inflation pressure at which the tire was tested as part of a tire-vehicle system that underwent stopping distance testing, and mu-slip data is generated for that tire at that inflation pressure.

EXAMPLE 1

As an example and without limitation, in one embodiment, testing comprising a stopping maneuver and tire traction testing was performed.

Without limitation, dry stopping distance testing was performed on tire-vehicle systems. A graph summarizing the dry stopping distance testing criteria is shown in FIG. 2. Stopping distance tests in Example 1 comprised testing on each of two vehicles, Vehicle 1 and Vehicle 2; on each of five tire specifications, referred to as codes SPECIFICATION A, SPECIFICATION B, SPECIFICATION C, SPECIFICATION D, and SPECIFICATION E; at each of three inflation pressures 20 psi, 30.5 psi, and 40 psi; at each of six test runs. For each test run, the tire-vehicle system performed a braking maneuver from a starting vehicle speed of 60 mph to a final vehicle speed of 0 mph.

Without limitation, each tire-vehicle system, upon which stopping distance testing was performed, was instrumented with sensors comprising a velocity sensor, a wheel encoder, a brake pressure transducer, an accelerometer, a brake pedal force transducer, and a brake pad thermocouple.

Without limitation, tire traction testing to obtain mu-slip data was performed using an MTS Flat-Trac® Tire Test System. Testing was performed upon a set of tires comprising two tires of each of three of the five tire specifications upon which the above-described dry stopping distance test were done, corresponding to codes SPECIFICATION A, SPECIFICATION B, and SPECIFICATION E, for a total of six tires. The testing on each of the six tires was performed at each of three inflation pressures, 20 psi, 30.5 psi, and 40 psi; at a vertical load of 944 lbf; and at a belt speed of 40 mph, for a total of 9 different tests conditions as summarized in FIG. 3.

Figure 3:
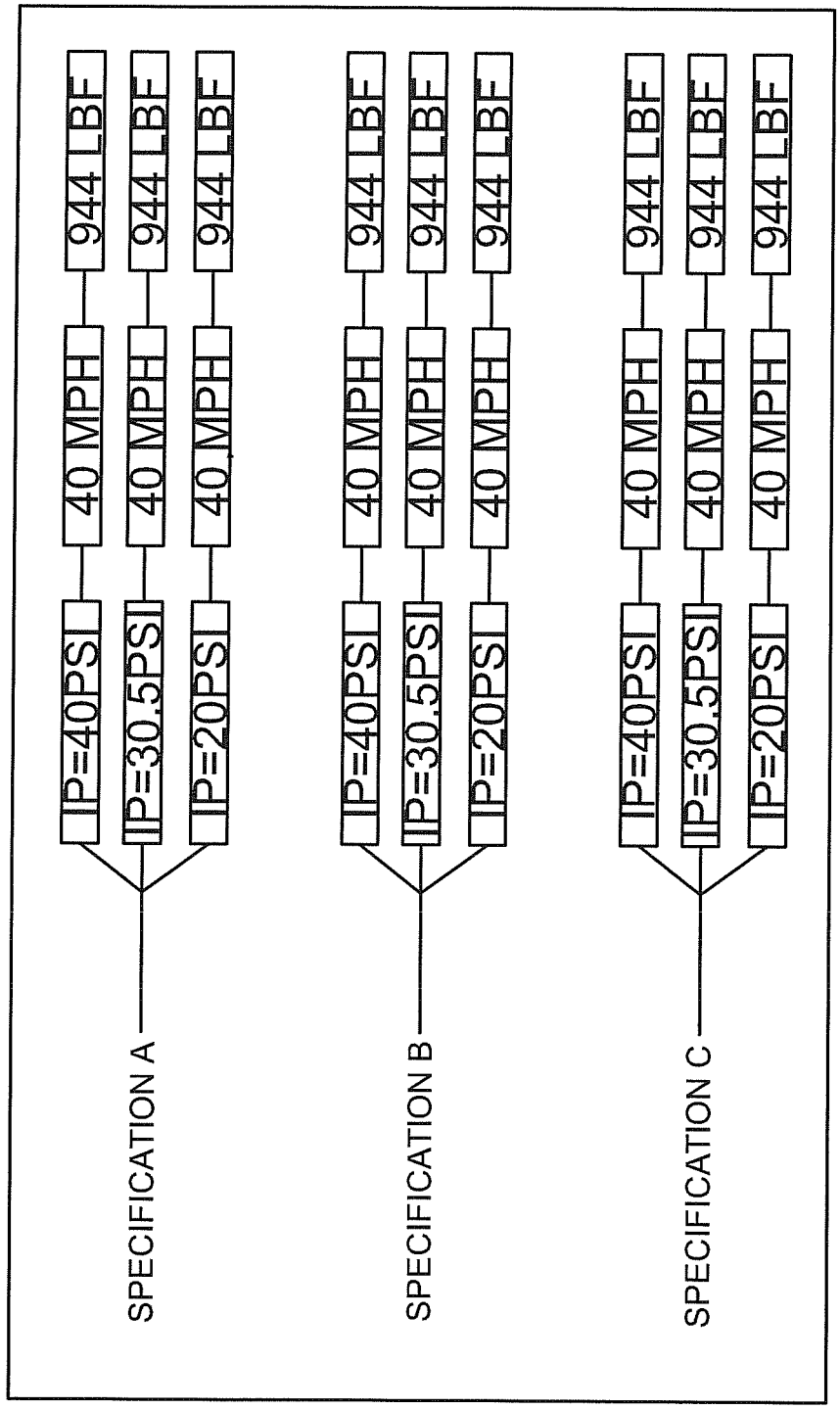
FIG. 3 is a graph summarizing testing conditions in one embodiment.
Figure 4:
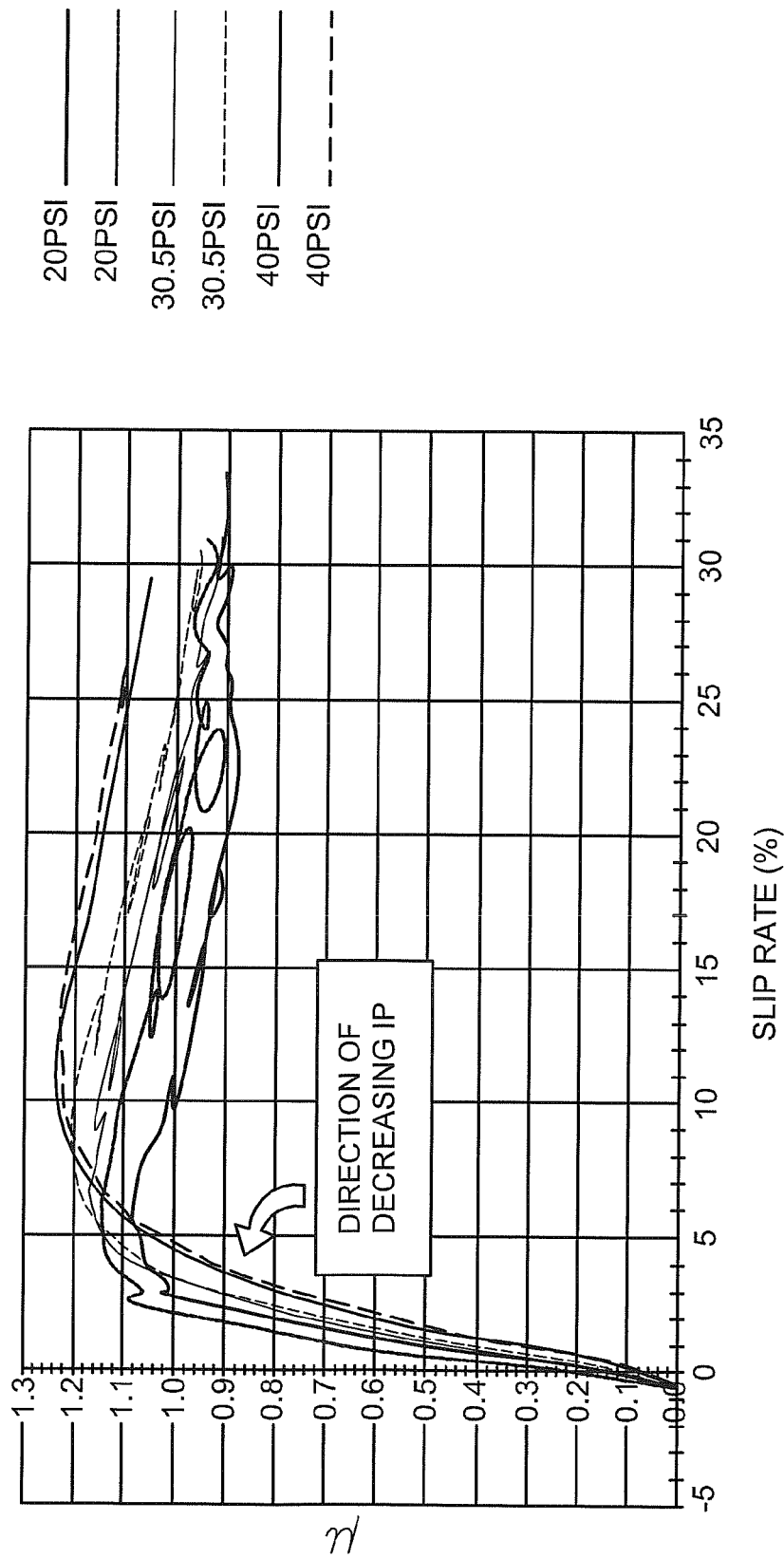
FIG. 4 is a non-limiting example of a mu-slip graph.
Figure 5:
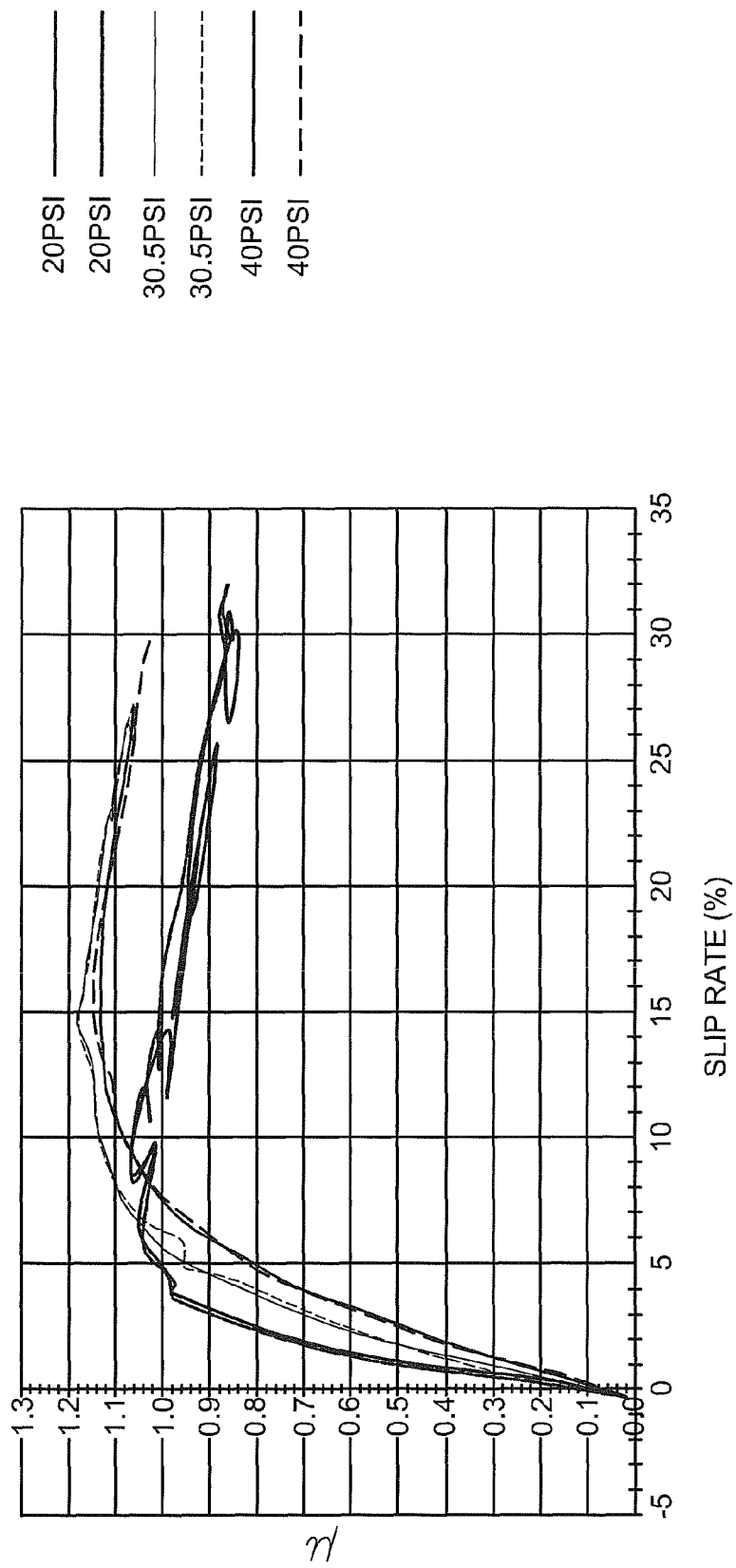
FIG. 5 is a non-limiting example of a mu-slip graph.
Figure 6:
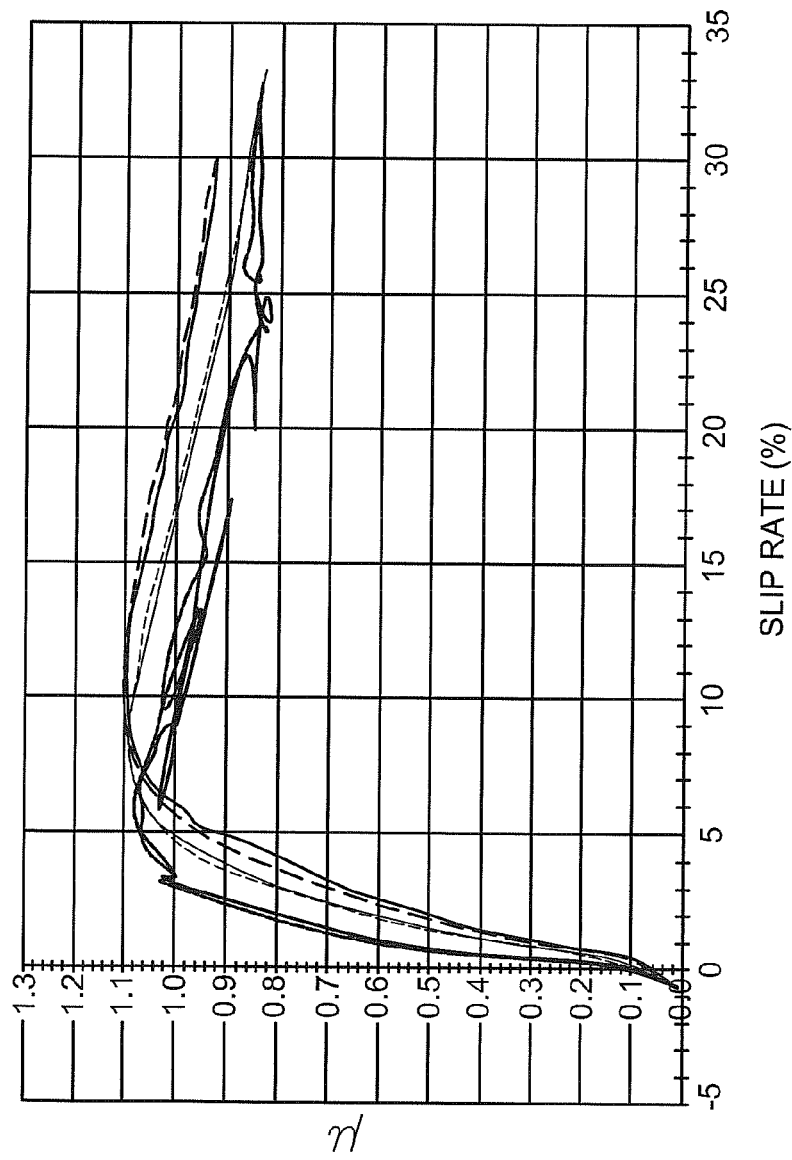
FIG. 6 is a non-limiting example of a mu-slip graph.

The results of the traction testing at the 9 different test conditions as summarized in FIG. 3 are shown graphically in FIGS. 4-6. Each of the FIGS. 4-6 is a mu-slip graph. FIG. 4 shows the results of testing both of the SPECIFICATION E tires at each of 20 psi, 30.5 psi, and 40 psi. FIG. 5 shows the results of testing both of the SPECIFICATION A tires at each of 20 psi, 30.5 psi, and 40 psi. FIG. 6 shows the results of testing both of the SPECIFICATION B tires at each of 20 psi, 30.5 psi, and 40 psi.

While the diagnostic tire test method has been described above in connection with the certain embodiments, it is to be understood that other embodiments may be used or modifications and additions may be made to the described embodiments for performing the same function of the diagnostic tire test method without deviating therefrom. Further, the diagnostic tire test method may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the diagnostic tire test method. Therefore, the diagnostic tire test method should not be limited to any single embodiment, but rather construed in breadth and scope in accordance with the recitation of the attached claims.

What is claimed is:

1. A method for testing a tire, comprising:
performing a first stopping distance test on a first tire-vehicle system comprising a first vehicle and a tire of a first specification at a first inflation pressure;
gathering data about the first stopping distance test; performing a second stopping distance test on a first tire-vehicle system comprising a first vehicle and a tire of a first specification at a second inflation pressure;
gathering data about the second stopping distance test;
performing a first traction test on a tire of the first specification at either the first inflation pressure or the second inflation pressure; and,
gathering data about the first traction test.

2. The method of claim 1, wherein gathering data about the first stopping distance test comprises gathering data sufficient to calculate a stopping distance.

3. The method of claim 2, wherein gathering data about the second stopping distance test comprises gathering data sufficient to calculate a stopping distance.

4. The method of claim 3, wherein gathering data about the first traction test comprises gathering data sufficient to calculate mu-slip data.

5. The method of claim 4, wherein gathering data about the first traction test comprises gathering data sufficient to graph a mu-slip curve.

6. The method of claim 5, wherein gathering data about the first stopping distance test and gathering data about the second stopping test comprises, gathering data comprising or sufficient to calculate, wheel angular position, wheel angular velocity, wheel angular acceleration, time, slip rate, braking force in the longitudinal direction, braking force in a direction other than the longitudinal direction, displacement in the longitudinal direction, displacement in a direction other than the longitudinal direction, velocity in the longitudinal direction, velocity in a direction other than the longitudinal direction, acceleration in the longitudinal direction, acceleration in a direction other than the longitudinal direction, or some combination thereof.

7. The method of claim 6, further comprising performing the first stopping distance test on a surface comprising concrete, asphalt, brick, gravel, sand, dirt, snow, water, ice, mud, oil, or some combination thereof.

8. The method of claim 7, further comprising performing the second stopping distance test on a surface that is substantially identical to that upon which the first stopping distance test is performed.

9. The method of claim 8, further comprising performing the first stopping distance test on a dry surface.

10. The method of claim 9, further comprising performing the first traction test on a FlatTrac.

11. A method for testing a tire, comprising: generating stopping distance data about a first tire-vehicle system comprising:
    a first vehicle and a tire of a first specification, said tire being inflated to a first inflation pressure;
    generating stopping distance data about a first tire-vehicle system comprising the first vehicle and a tire of the first specification, said tire being inflated to a second inflation pressure;
    generating mu-slip data about a tire of the first specification at either the first inflation pressure or the second inflation pressure.

12. The method of claim 11, comprising generating a mu-slip curve from mu-slip data about a tire of the first specification at both the first inflation pressure and the second inflation pressure.

13. The method of claim 12, wherein generating stopping distance data about a first tire-vehicle system comprising a first vehicle and a tire of a first specification, said tire being inflated to a first inflation pressure, comprises
    performing a first stopping distance test on a first tire-vehicle system comprising a first vehicle and a tire of the first specification at a first pressure; and
    gathering data about the first stopping distance test.

14. The method of claim 13, wherein generating stopping distance data about a first tire-vehicle system comprising the first vehicle and a tire of the first specification, said tire being inflated to a second inflation pressure, comprises
    performing a second stopping distance test on a first tire-vehicle system comprising a first vehicle and a tire of a first specification at a second pressure; and
    gathering data about the second stopping distance test.

15. The method of claim 14, wherein said gathering data about the first stopping distance test and gathering data about the second stopping test comprises, gathering data comprising or sufficient to calculate, stopping distance, wheel angular position, wheel angular velocity, wheel angular acceleration, time, slip rate, braking force in the longitudinal direction, braking force in a direction other than the longitudinal direction, displacement in the longitudinal direction, displacement in a direction other than the longitudinal direction, velocity in the longitudinal direction, velocity in a direction other than the longitudinal direction, acceleration in the longitudinal direction, acceleration in a direction other than the longitudinal direction, or some combination thereof.

16. The method of claim 15, wherein said gathering data about the first stopping distance test and gathering data about the second stopping test is performed using a sensing system enabled to collect data regarding, or sufficient to calculate, stopping distance, wheel angular position, wheel angular velocity, wheel angular acceleration, time, slip rate, braking force in the longitudinal direction, braking force in a direction other than the longitudinal direction, displacement in the longitudinal direction, displacement in a direction other than the longitudinal direction, velocity in the longitudinal direction, velocity in a direction other than the longitudinal direction, acceleration in the longitudinal direction, acceleration in a direction other than the longitudinal direction, or some combination thereof.

17. The method of claim 16, further comprising performing the first stopping distance test on a surface comprising concrete, asphalt, brick, gravel, sand, dirt, snow, water, ice, mud, oil, or some combination thereof.

18. The method of claim 17, further comprising performing the second stopping distance test on a surface that is substantially identical to that upon which the first stopping distance test is performed.

19. The method of claim 18, wherein generating mu-slip data about a tire of the first specification at either the first inflation pressure or the second inflation pressure, comprises
    performing a first traction test on a tire of the first specification at either the first inflation pressure or the second inflation pressure; and
    gathering data about the first traction test.

20. The method of claim 19, wherein said performing a first traction test on a tire of the first specification at either the first inflation pressure or the second inflation pressure comprises performing the first traction test on a FlatTrac.

* * * * *